March 12, 1963  J. V. SHOEMAKER  3,081,132
WHEEL COVER

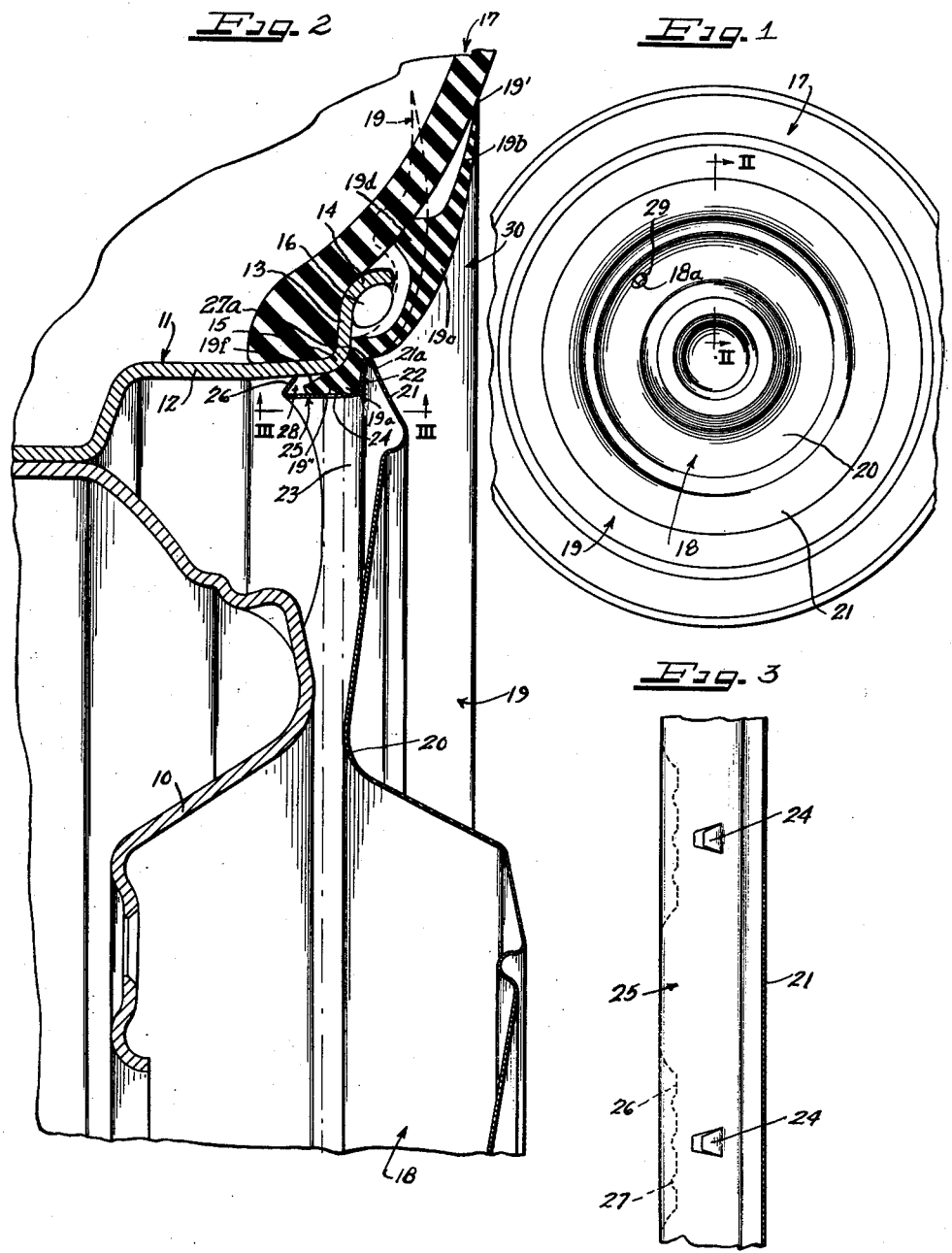

Filed Jan. 27, 1958  2 Sheets-Sheet 2

Inventor
JOHN V. SHOEMAKER

United States Patent Office 3,081,132
Patented Mar. 12, 1963

3,081,132
WHEEL COVER
John V. Shoemaker, Detroit, Mich., assignor to Lyon Incorporated, Detroit, Mich., a corporation of Delaware
Filed Jan. 27, 1958, Ser. No. 711,291
8 Claims. (Cl. 301—37)

The present invention relates to improvements in wheel structures and more particularly concerns the provision of novel means for providing a wheel with a simulated white or colored side wall for a tire on the wheel.

For ornamental purposes, automobile tires are commonly provided with white side walls, the remainder of the tire being of a more or less black appearance. The white rubber used for the white side wall is applied as a veneer and is of a different composition than the remainder or body of the tire and actually requires a different vulcanizing treatment to the extent that the temperature and time of cure are somewhat different than for the black rubber of the tire body. This has created some necessity for compromise in the vulcanization of tires with white side walls, generally resulting in a sacrifice of quality in the white wall. To overcome the disadvantages of cure compromise, it has been proposed to secure the white side wall portion or veneer to the side wall of the tire after the tire has been vulcanized. Such after-attached side wall members are inherently liable to such disadvantages as peeling, and the like, and of course require a separate attaching or vulcanizing operation that raises cost.

It has also been heretofore proposed to provide separate simulated white side wall ring members that are secured between the terminal flange of the tire rim and the bead portion of the tire and which hug the side wall of the tire. Such simulated or mock tire white side wall rings require, of course, that the tire be deflated in order to install the ring members. Should such simulated white side wall rings become damaged, it is necessary to deflate the tire not only to remove the damaged ring but also to replace the ring. Furthermore, a disadvantage of such simulated white side wall rings is that, especially with tubeless tires, there is interference with proper sealing, gripping engagement of the tire bead portion with the opposing surfaces of the tire rim. More particularly, the interference occurs at the radial flange area or the radial rim portion of the terminal flange since formerly the white side wall ring was interposed between the tire side wall and the radial flange or radial portion of the terminal rim flange.

It is accordingly an important object of the present invention to overcome the foregoing difficulties and disadvantages of the prior expedients and to provide a simulated tire white side wall of improved appearance and which can be applied, or removed, or replaced without disturbing the tire.

Another difficulty has been experienced, more recently, with the disposition of the side wall ring on the axially outer side of the terminal rim flange, since the side wall ring has a tendency to engage the outer tip of the axial flange with the result that the side wall ring rubs thereagainst and becomes worn thereby weakening the intermediate ring section.

Another important object of the present invention is to provide an improved tire side wall simulating member which has means for maintaining the side wall simulating member out of engagement with the terminal rim flange.

Still another object of the invention is to provide an improved tire side wall simulating member which also serves as means for covering the tire rim terminal as well as wheel balancing weights that may be carried by such flange, and whereby still another object is to maintain the side wall simulating member axially spaced from the tire rim terminal flange as well as the wheel balancing weights to minimize frictional wearing of the tire side wall simulating member.

A further object of the invention is to provide a novel tire side wall simulating ring member which is adapted for optional assembly with a wheel cover for disposition over the outer side of the wheel.

Yet another object of the invention is to provide new and improved means on a wheel cover section which is adapted to become embedded in the inner margin of the tire side wall simulating member so that the tire side wall simulating ring member will corotate with the wheel.

Another and still further object of the invention is to provide a tire side wall simulating flexible ring device which is adapted to be carried in clamped engagement with the outer side of a tire rim.

Yet still another object of the invention is to provide cushioning means for a wheel cover, also adapted for providing a tire side wall ring simulating member.

Other objects, features an advantages of the present invention will more readily become apparent from the following detailed description of certain preferred embodiments thereof, taken in conjunction with the accompanying sheets of drawings, in which:

FIGURE 1 is an outer side elevation of a wheel structure embodying features of the present invention;

FIGURE 2 is an enlarged fragmentary cross-sectional view taken substantially on the line II—II of FIGURE 1;

FIGURE 3 is an enlarged fragmentary cross-sectional view taken substantially on the line III—III of FIGURE 2 looking in the direction indicated by the arrows;

Figure 4:
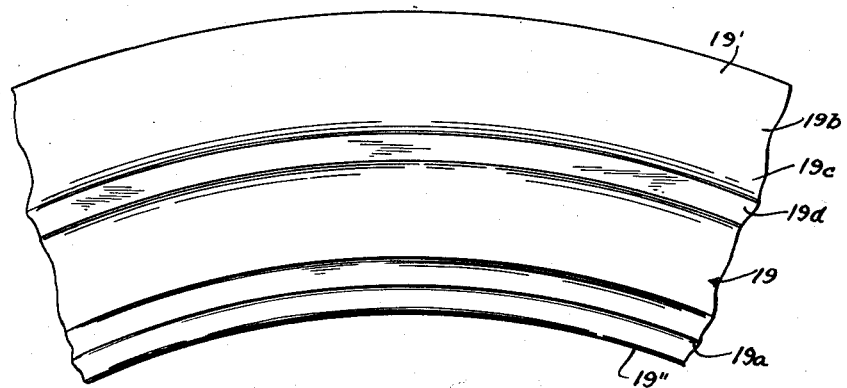
FIGURE 4 is an enlarged fragmentary elevation of the axially inner side of the side wall ring.

Referring to FIGURES 1 and 2, an automobile wheel including a disk spider wheel body 10 supports a tire rim 11 including an intermediate generally axially extending rim flange 12, a radial rim flange 13, and an axially elongated terminal rim flange 14. The rim flanges 12 and 13 are junctioned at 15 and provide an annular shoulder for purposes which will hereafter become apparent. Supported upon the terminal rim flange in the groove at the outer side of the wheel defined by the radial and terminal rim flanges 13 and 14 are a series of wheel balancing weight structures 16 which are hooked over the terminal rim flange 14 in a conventional manner. Mounted upon the tire rim is a pneumatic tire assembly 17 of preferably the tubeless type and which may be inflated by inserting air into a valve stem 18a, shown in FIGURE 1.

Disposed at the outer side of the wheel is a circular wheel cover member 18 and a side wall ring member indicated generally at 19.

The wheel cover 18 is preferably of the self-retaining type and to this end, the cover 18 includes an intermediate dished portion 20 radially outwardly of which is a generally radially outwardly axially inwardly projecting annular marginal portion 21 of a diameter to overlie the junction 15 of the rim flanges 12 and 13. An outer terminal underturned reinforcing and finishing flange 22 is disposed behind the cover margin in axially spaced relation to the wheel and leads into a generally axially inwardly extending cover retaining flange 23 of slightly smaller diameter than the axially outer portion of the tire rim intermediate flange 12 so the flange 23 may be telescoped inside of the annular rim flange 23 when the cover is in assembly on the wheel. The flange 23 is provided at circumferentially spaced intervals with struck out generally axially inwardly radially outwardly extending tabs or tangs 24 according to certain features of the present invention. The tabs when in assembly with the ring 19 are indented slightly into the ring. When the cover is applied to the wheel, the tabs or tangs are embedded into the material of the ring and operate to pull the material of the ring into snug engagement between the rim flange 12 and the axial cover flange 23. These tangs also operate to assist in resisting the material from oozing out from under the cover. Thus, the tangs cooperate with the cover 18 and the rim flanges 12 and 13 to increase the friction to resist radially outward pull-out or displacement of the relatively flexible ring 19. In addition, the flange 23 has a series of generally axially inwardly extending retaining fingers 25 provided with short and stiff generally radially and axially outwardly oblique terminals 26 which may be notched as indicated at 27 in FIGURE 3 in a conventional manner. The terminals 26 are retainingly engageable in gripping cover retaining relation with the intermediate flange 12 under resilient tension of the retaining fingers 25 which are resiliently radially inwardly deflected from a normal diameter wherein the tips of the finger terminals 26 lie on a slightly larger diameter than the engaged inside surface portion of the intermediate rim flange 12 in the assembled relationship of the cover on the wheel.

The cover is assembled on the outer side of the wheel by registering a valve stem aperture 29 (FIGURE 1) in the dished portion 20 with the valve stem 18a carried by the wheel. Then by applying axially inward pressure on the cover 18, the annular series of retaining fingers 25 effect cover retaining engagement with the tire rim. It will be appreciated the cover 18 may be made from any suitable material such as spring steel and the like.

For affording the appearance of the tire 17 having a white side wall, the ring member 19 is preferably made from a rubber-like material and for which a synthetic rubber such as butyl is especially desirable. Such synthetic rubber is characterized by especially desirable form sustaining resilient flexibility, good color qualities and excellent durometer control.

For affording a tire side wall simulating shape for the ring member 19, it is of generally axially outwardly curved transverse or radial shape terminating in a thin, and in this instance substantially feather edge radially outer extremity 19' engageable against the side wall of the tire 17. In assembly with the wheel, the outer extremity appears as a fine line generally merging with the wheel so that the ring member appears on the wheel as though it were an integral side wall portion of the tire.

The side wall 19 is provided with a radially inner peripheral edge or bead area of thicker section indicated at 19" which is adapted to abut against the cover retaining structure or flange portion 23. The side wall ring 19 also includes a radially inner stepped margin 19a and a radially outer margin 19b which margins 19a and 19b are linked together by an annular arcuate intermediate ring section 19c. Disposed on the axially inner side of the intermediate ring section 19c is a molded annular rib or protuberance area 19d which is adapted to abut when assembled with the wheel against the side wall of the tire 17 so as to maintain the arcuate annular intermediate ring section in radially and axially spaced relation with respect to the terminal rim flange 14 so that the ring 19 will be precluded from rubbing thereagainst thereby wearing and weakening the intermediate rim area of the side wall 19. The outside diameter of the ring member 19 at the tire engaging edge 19' thereof, is such that the edge 19' engages the tire wall on the incurve of the outer side wall, in radially spaced relation to the terminal rim flange 14.

Therefore, according to certain other features of the present invention means as described above have been provided to substantially reduce or eliminate wearing and weakening of the intermediate rim section of the rubber-like side wall 19 as a consequence of the side wall 19 being rubbed against the wheel balancing weights, the rim flange 14, and which means also serves to rigidify the area of the side wall to prevent its collapse.

As is evident from FIGURE 2, the inner margin 19a is substantially thickened and is stepped so that it may abut against the flanges 12 and 13 and their junction 15. The stepped configuration of the radially inner and radially outer surfaces of the stepped inner margin 19a are also advantageous to prevent pull-out of the ring since these surfaces frictionally engage with the rim flanges 12 and 13 and the cover flanges 22 and 23. In addition, the junction of the inner margin 19a and the intermediate ring section 19c at 27a is seated against outer peripheral edge 21a of the cover which edge provides a fulcrumming point when the edge 19' is grasped and pulled radially and axially away from the tire to expose the wheel balancing weight 16 in order to adjust the same.

To assemble the cover 18 and the ring 19 upon the wheel, the cover 18 and the ring 19 may be preferably assembled together before being applied to the wheel. To this end, an inner marginal edge area 19" is engaged with a portion of the flange 23 and then by stretching or elongating the ring member by grasping the margin 19b of the ring and pulling the same radially away from the cover the balance of the inner marginal edge 19" may be elastically snapped into annular pocket 28 defined between the cover flanges 22, 23, and the finger extensions 25 including the return bent terminal 26. The material of the ring is displaced by the tabs 24. When the cover and ring are in assembly they may not readily be pulled apart unless the ring 19 is again stretched radially outwardly of the cover to enable the inner marginal edge 19" to move axially away from and out of assembly with respect to the cover 18.

To apply the cover and ring assembly on the wheel valve stem 18a is centered with cover opening 29 and the assembly is pressed against the wheel with the fingers 25 deflecting and retainingly securing the ring and cover in assembly on the wheel. As the ring is applied to the wheel it will move from the dotted line position to the full line position shown in FIGURE 2.

Seating of the cover and ring assembly will be facilitated since an annular tapered lead-in surface 19f is provided enabling the ring and cover to be gradually deflected until the ring is seated against and between the cover and the tire rim.

The cover and ring may be removed from the wheel by grasping the ring margin 19b and pulling ring flap portion 30 axially outwardly and radially inwardly with the ring being fulcrummed and pivoted on the cover edge 21c. Then a pry-off tool may be forced between the cover and the rim to disengage the cover and the ring from the wheel. The position of the wheel balancing weights 16 may altered by again pulling the flap portion 30 away from the wheel and after the adjustment is made the flap may be pushed back against the wheel.

Figure 5:
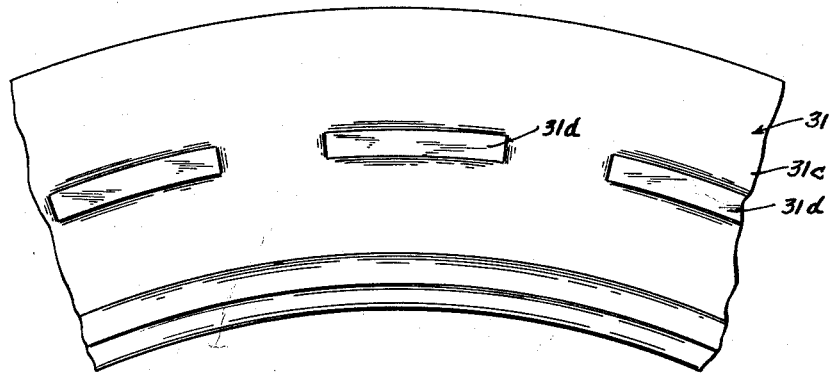
FIGURE 5 is an enlarged fragmentary rear elevation similar to FIGURE 4 only showing a modified side wall ring construction.

In FIGURE 5 is a modified side wall plastic ring construction 31 which is identical in every respect with the ring 19. In the present instance disposed on an intermediate ring section 31c or area is a molded annular rib or protuberance area comprised of a series of circumferentially spaced abutments, projections or projections 31d which serve the same function as the protuberance area 19d on ring 19. By spacing the protuberances, drainage of water between the side wall and the tire may be more readily brought about.

Figure 6:
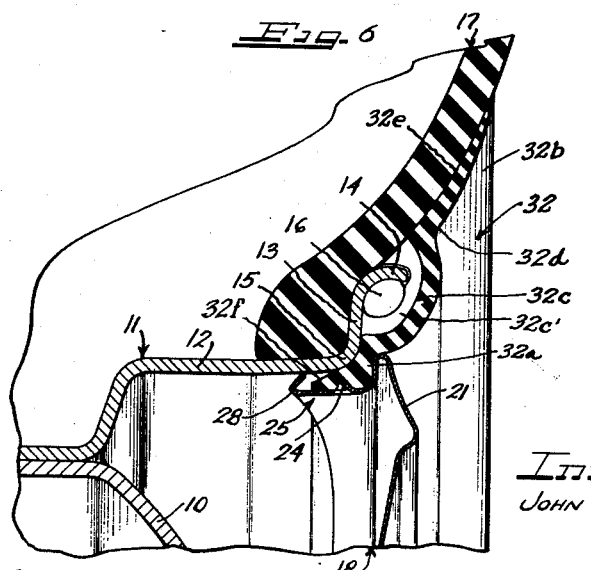
FIGURE 6 is an enlarged fragmentary cross-sectional view similar to FIGURE 2 only illustrating a still further modified side wall ring construction.

In FIGURE 6 is shown still another modified side wall plastic ring construction 32. In this instance, molded annular rib or protuberance area 32d is joined with outer ring margin 32b in a different manner. To this end, the side wall plastic ring has a continuous relatively wide radially outwardly extending surface area 32e nestingly engaging and following the curvature of the tire side wall 17 which surface area includes both the annular rib area and the outer ring margin 32b. This wide surface 32e also serves to minimize grooving and frictional wear of the tire side wall at any given point since friction between them will occur over a wider side wall area.

Between an inner ring margin 32a and the outer ring margin 32b is a single dished pocket area 32c' defined by intermediate ring section or area 32c which joins the opposed margins.

The assembly and removal of the modified forms of my invention may be brought about in the same manner described in connection with the first form of my invention. In this respect please note the ring 32 is again provided with an annular inclined or tapered lead-in surface 32f to assist in the assembly of the ring and cover with the wheel.

In all forms of my invention in the fully engaged retained gripping relationship of the finger terminals 26, there is an enhanced gripping clamping interlocking of the inner margin of the cover flange 23 with the bead ring portion 19a by the further radially inward thrusting of the tabs into the material of the bead portion 19a of the ring 19.

It will be understood that modifications and variations may be effected without departing from the scope of the novel concepts of the present invention.

I claim as my invention:

1. In a wheel structure, a wheel including a tire rim having an axially extending terminal flange and a pneumatic tire mounted upon the rim, a wheel cover section in detachable assembly with the wheel, and a side wall ring including inner and outer peripheral edge areas and ring margins with the ring having its inner ring margin retainingly sustained upon the wheel by the coaction between the cover section and the tire rim and with its outer peripheral edge area adjacent its outer ring margin abutted against a side wall of the pneumatic tire, said side wall ring having an intermediate ring section joining the ring margins together, and structure on said side wall ring bearing against the tire side wall maintaining the intermediate ring section spaced axially free of contact with the axially extending terminal rim flange to preclude the terminal rim flange from rubbing against, wearing and weakening the intermediate ring section, said structure comprising circumferentially spaced protuberances molded and formed integral in one piece with an axially inner side wall area of the intermediate ring section bearing against the tire side wall spaced between the inner and outer peripheral edge areas on the ring.

2. In a wheel structure, a wheel including a tire rim having an axially extending terminal flange and a pneumatic tire mounted upon the rim, a wheel cover section in detachable assembly with the wheel, and a side wall ring including inner and outer peripheral edge areas and ring margins with the ring having its inner ring margin retainingly sustained upon the wheel by the coaction between the cover section and the tire rim and with its outer peripheral edge area adjacent its outer ring margin abutted against a side wall of the pneumatic tire, said side wall ring having an intermediate ring section joining the ring margins together, and structure on said side wall ring bearing against the tire side wall maintaining the intermediate ring section spaced axially free of contact with the axially extending terminal rim flange to preclude the terminal rim flange from rubbing against, wearing and weakening the intermediate ring section, said structure comprising an annular radially inwardly offset bead molded and formed integral in one piece with an axially inner side wall area of the intermediate ring section bearing against the tire side wall spaced between the inner and outer peripheral edge areas and providing three point engagement between the ring with the rim and the tire.

3. In a wheel structure, a wheel including a tire rim having an axially extending terminal flange and a pneumatic tire mounted upon the rim, an ornamental automobile wheel cover section in detachable assembly with the wheel, and a side wall ring including inner and outer peripheral edge areas and ring margins with the ring having its inner ring margin retainingly sustained upon the wheel by the coaction between the cover section and the tire rim and with its outer peripheral edge area adjacent its outer ring margin abutted against a side wall of the pneumatic tire, said side wall ring having an intermediate ring section joining the ring margins together, structure on said side wall ring bearing against the tire side wall maintaining the intermediate ring section spaced axially free of contact with the axially extending terminal rim flange to preclude the terminal rim flange from rubbing against, wearing and weakening the intermediate ring section, and tabs turned away from the cover embedded in the inner ring margin substantially increasing resistance to relative rotational movement between the side wall ring and the wheel and resisting radially outward pull-out of the ring from between the tire rim and the wheel cover section.

4. In a wheel structure, a wheel including a tire rim having an axially extending terminal flange and a pneumatic tire mounted upon the rim, a wheel cover section in detachable assembly with the wheel, and a side wall ring including inner and outer periperal edge areas and ring margins with the ring having its inner ring margin retainingly sustained upon the wheel by the coaction between the cover section and the tire rim and with its outer peripheral edge area adjacent its outer ring margin abutted against a side wall of the pneumatic tire, said side wall ring having an intermediate ring section joining the ring margins together, and structure on said side wall ring bearing against the tire side wall maintaining the intermediate ring section spaced axially free of contact with the axially extending terminal rim flange to preclude the terminal rim flange from rubbing against, wearing and weakening the intermediate ring section, said inner ring margin having a stepped cross section including an axially outwardly facing shoulder with said stepped inner ring margin being clampingly abutted and sustained against the rim by said cover section bearing against said shoulder during its assembly with the wheel said cover section having resiliently deflectable retaining structure underlying the cover section with tabs turned therefrom and embedded in the material of the sidewall ring to resist relative movement of the side wall ring with respect to the wheel and resisting radially outward pull-out of the ring from between the tire rim and the wheel cover section.

5. In a wheel structure, a wheel including a stepped tire rim having consecutive flanges with junctions at the respective intersections of the flanges including intermediate, radial and terminal rim flanges and a pneumatic tire mounted upon the rim, a wheel cover section having underlying retaining structure adjacent its outer margin including resiliently deflectable retaining extensions in detachable assembly with the intermediate rim flange, and a side wall ring including inner and outer peripheral edge areas and ring margins with the ring having its inner ring margin elastically stretched over and sustained in assembly with the cover by its engagement with the underlying retaining structure, the inner ring margin being stepped and abutted against the intermediate and radial rim flanges and retainingly sustained upon the wheel by the coaction between the cover section and the tire rim whereby the retaining extensions draw the cover against and clamp the stepped inner ring margin against the rim and with its outer peripheral edge area adjacent its outer ring margin abutted against a side wall of the pneumatic tire, said side wall ring having an intermediate ring section joining the ring margins together, and tabs turned away from an axially extending flange portion of the retaining structure and embedded in and displacing the material of the inner ring margin substantially increasing frictional resistance pull-out of the ring from between the rim flanges and the cover section.

6. The wheel structure of claim 5 further characterized by the inner peripheral edge area of the inner ring margin including an annular radially and axially outwardly inclined lead-in with the lead-in being disposed generally radially outwardly of the tabs.

7. In a wheel structure, a wheel including a stepped tire rim having a series of consecutive flanges with junctions at the respective intersections of the flanges including intermediate, radial and terminal rim flanges and a pneumatic tire mounted upon the rim, a wheel cover section having underlying retaining structure adjacent its outer margin including resiliently deflectable retaining extensions in detachable assembly with the intermediate rim flange, and a side wall ring including inner and outer ring margins with the ring having its inner margin stepped and abutted against the intermediate and radial rim flanges and retainingly sustained upon the wheel by the coaction between the cover section and the tire rim whereby the retaining extensions draw the cover against and clamp the stepped inner margin against the rim and with the side wall bridged over the terminal rim flange having its outer ring margin abutted against a side wall of the pneumatic tire, and tabs turned radially away from an axially extending flange portion of the retaining structure which are adapted to slightly indent the inner ring margin when the cover and ring are in assembly and which is further adapted to be embedded in the ring margin after the cover and ring have been assembled on the wheel with the tabs functioning to prevent the inner ring margin from oozing out from between the rim and cover.

8. In a wheel structure of the type including a stepped tire rim having a series of consecutive flanges with junctions at the respective intersections of the flanges including intermediate, radial and terminal rim flanges for carrying a pneumatic tire on the rim, a wheel cover having retaining structure underlying its outer cover margin including resiliently deflectable retaining extensions for detachable cover retaining assembly with an intermediate rim flange, and a side wall ring including inner and outer ring margins with the ring having its inner margin stepped for abutment against intermediate and radial rim flanges and for retention upon a wheel by the coaction between the cover and a tire rim with the retaining extensions drawing the outer cover margin axially inwardly into axial engagement against a stepped inner rim margin for clamping the stepped inner ring margin against intermediate and radial rim flanges, and tabs disposed axially inwardly of the outer cover margin and being extended radially outwardly from an axially extending flange portion of the retaining structure which tabs are bitingly engaged with the inner ring margin for forcing the inner ring margin against an intermediate rim flange to prevent the inner ring margin from pulling out from between a tire rim and the cover.

References Cited in the file of this patent
UNITED STATES PATENTS

| | | |
|---|---|---|
| 1,452,795 | Hooydonck | Apr. 24, 1923 |
| 1,968,076 | Goodyear et al. | July 31, 1934 |
| 2,248,265 | Wright | July 8, 1941 |
| 2,368,246 | Lyon | Jan. 30, 1945 |
| 2,530,108 | Whichard et al. | Nov. 14, 1950 |
| 2,607,632 | Lyon | Aug. 19, 1952 |
| 2,624,634 | Lyon | Jan. 6, 1953 |
| 2,682,937 | Lyon | July 6, 1954 |
| 2,696,409 | Barnes | Dec. 7, 1954 |
| 2,964,357 | Barnes | Dec. 13, 1960 |

FOREIGN PATENTS

| | | |
|---|---|---|
| 401,345 | Great Britain | Nov. 13, 1933 |
| 436,544 | Great Britain | Oct. 14, 1935 |
| 1,061,278 | France | Nov. 25, 1953 |